Sept. 10, 1968     W. F. STALEY, JR     3,401,403

STACKABLE PEN AND SLIDEWIRE MODULE FOR STRIP CHART RECORDER

Filed April 27, 1967     3 Sheets-Sheet 1

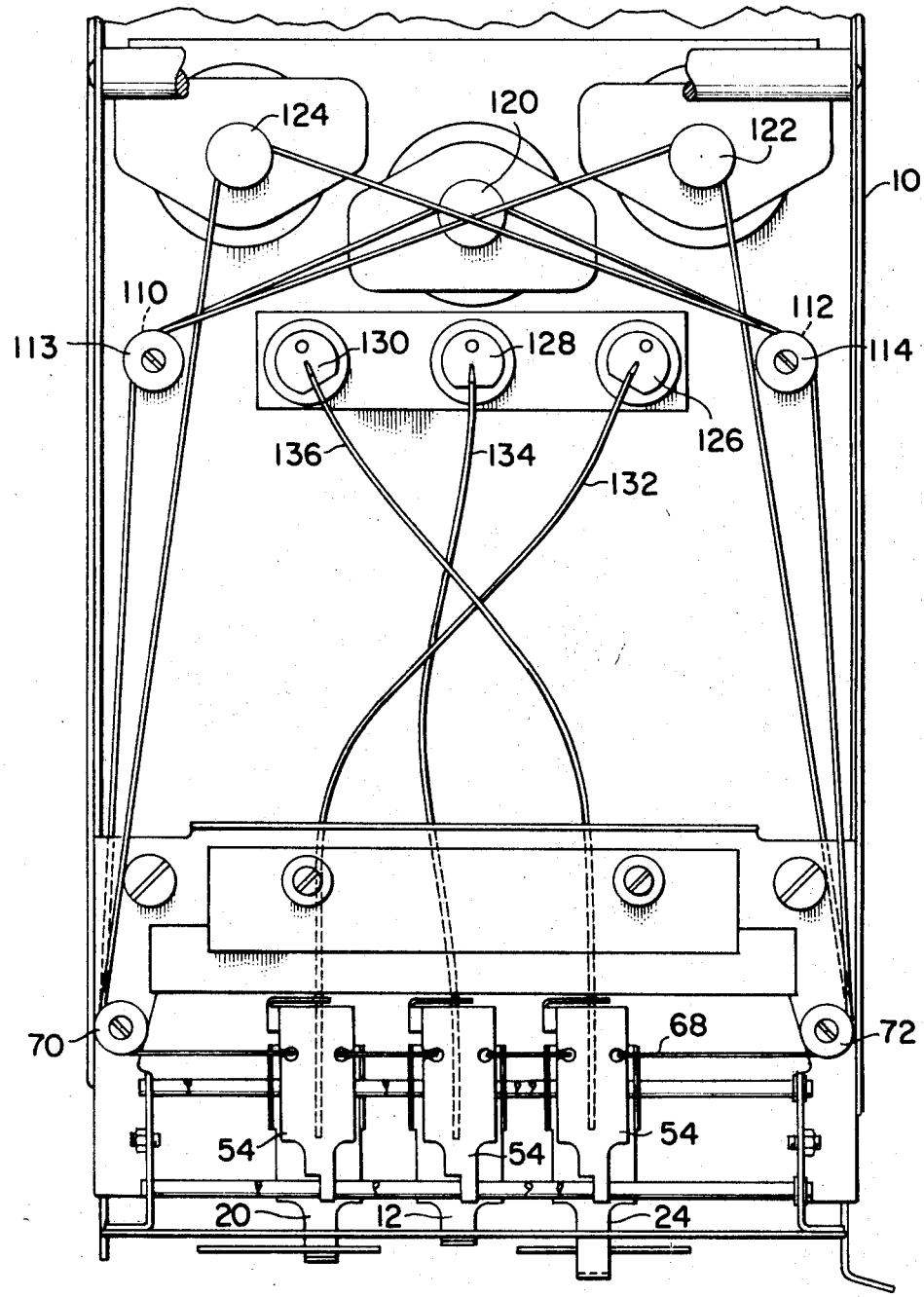

United States Patent Office 3,401,403
Patented Sept. 10, 1968

3,401,403
STACKABLE PEN AND SLIDEWIRE MODULE FOR STRIP CHART RECORDER
Walton Freace Staley, Jr., Philadelphia, Pa., assignor to Leeds & Northrup Company, Philadelphia, Pa., a corporation of Pennsylvania
Filed Apr. 27, 1967, Ser. No. 634,246
4 Claims. (Cl. 346—145)

ABSTRACT OF THE DISCLOSURE

An automatic self-balancing recorder for recording and indicating the values of one or more measured quantities in which most of the elements necessary for recording or indicating a single condition, i.e. a slidewire and trolley, scale, pen carriage structure and guide means therefor, slidewire contact, and means to support a drive connection for the pen carriage structure are incorporated in a pen module which is constructed and arranged to include a mounting facility for stacking one on top of another. The recorder includes means for supporting the pen modules in cantilever fashion in stacked array so that to add another pen and indicator and additional measuring system components to expand the cability of the recorder, all that needs to be done is to add a pen module to the stack and other required components and hook up the cable the pen carriage structure to the capstan of a servo motor, electrically connect slidewire to the measuring system and connect the recording pen to its ink supply.

BACKGROUND OF THE INVENTION

Field of the invention

This invention relates generally to the field of strip chart recording instruments and more specifically it relates to plural pen recorders.

Description of the prior art

In Patent 3,071,772 to Johnson et al., there is disclosed a strip chart recorder of very high precision and of compact design adapted for measuring one or more quantities and for recording and/or indicating the magnitude of such quantities. In such a recorder, the measured quantities are converted into proportional electrical quantities which are then utilized to drive a motor which in turn drives an indicating means. The type of measuring circuit and motor driving means applicable in recorders of the type disclosed in Patent 3,071,772 may be of the type shown in Williams Patent 2,113,164 or in Williams Patent 2,367,-746. Electrical measuring circuits of the type disclosed in the two Williams patents are by now well known and quite conventional and therefore no detailed description of such measuring circuits is deemed necessary. Suffice to say that such circuits utilize a transducer to convert an external variable into a proportional electrical signal, which signal is fed into a measuring network. Variations in the external variable cause an unbalance of the measuring network which produces an output signal utilized to drive a servo motor. The shaft of the servo motor is, for example, connected relatively to move a contact with respect to a slidewire which is electrically connected in the measuring network so that variations in the included portion of the slidewire resistance tend to rebalance the measuring network and reduce the output signal to zero. In this manner, the position of the contact along the slidewire when the measuring circuit is balanced is proportional to the magnitude of the external variable; and by providing an indicating device or a recording pen which moves in correspondence with the relative movement between the slidewire and contact, the value of this external variable may be monitored.

In the strip chart recorder of Patent 3,071,772 a main frame is provided for supporting a chart and the drive mechanism therefor, together with servo motor-slidewire assemblies (not shown) for positioning pens in accordance with the values of the measured variables. The frame also supports the guide rods for the pen and indicator carriages. It will be apparent that one balancing motor, one slidewire and slidewire contact combination, and one indicating and recording carriage is necessary for each external variable under measurement. In a recorder of the type disclosed in the patent the servo motor associated with each measured variable is geared to a shaft which has mounted thereon an arm supporting a slidewire contact and a drum mechanically linked to the pen carriage by means of a string and pulley arrangement. Scales are provided which are fastened to the front of the frame for providing an indication of the value of the measured quantities.

Strip chart recorders of the compact precision type disclosed in the referred to patent may be purchased in single or two pen models. A two pen model required that an additional servo motor-slidewire assembly, and parts for a second recording pen, etc. be provided when the instrument was initially assembled; otherwise it was necessary to rebuild the instrument to add all of the various elements necessary to measure and record a second variable. It is desirable from a manufacturing point of view to provide a recording instrument that can be made initially, or readily changed over in the field, simply by adding parts necessary to make a single pen recorder, a two, or three pen recorder.

It is therefore a primary object of this invention to provide a recording instrument adapted to be readily assembled to record and indicate different numbers of measured quantities.

It is a more specific object of this invention to provide an assembled component of pen carriage and slidewire contact, pen carriage guide, slidewire, and scale which is stackable so that pens can be readily added to or subtracted from a recording instrument.

Summary of the invention

These objects are obtained in one form of this invention by the provision of a pen module comprising a plate member including guide means for movably supporting a carriage for a recording pen and slidewire contact. The plate also supports a straight slidewire and trolley positioned for engagement with the slidewire contact as the carriage moves back and forth along the guide means. The module includes a pair of pulleys to coact with a cable for moving the carriage. The pen module is adapted to be mounted on a recorder frame for support within an instrument housing, and by the use of spacers a plurality of these pen modules may be stacked on top of each other. Each module is adapted to be operatively connected to a different plug-in measuring circuit which controls operation of its corresponding servo motor. The recorder frame includes mounting means for a servo motor for each module and means are provided to space the drive pulley of each motor at a level to cooperate with a cable to move its respective pen carriage. In addition to mounting means for each servo motor there are provided on the frame mounting means for spaced pulleys for each cable, and mounting means for each ink well when ink wells are used.

The subject matter regarded as the invention is particularly pointed out and distinctly claimed in the appended claims. The invention, however, both as to its mode of operation, together with further objects and advantages thereof, may best be understood with reference to the following description taken in connection with the accompanying drawings in which:

Brief description of the drawings

FIG. 4 is a top view of the recorder of FIG. 1.

Detailed description of the drawings

Figure 1:
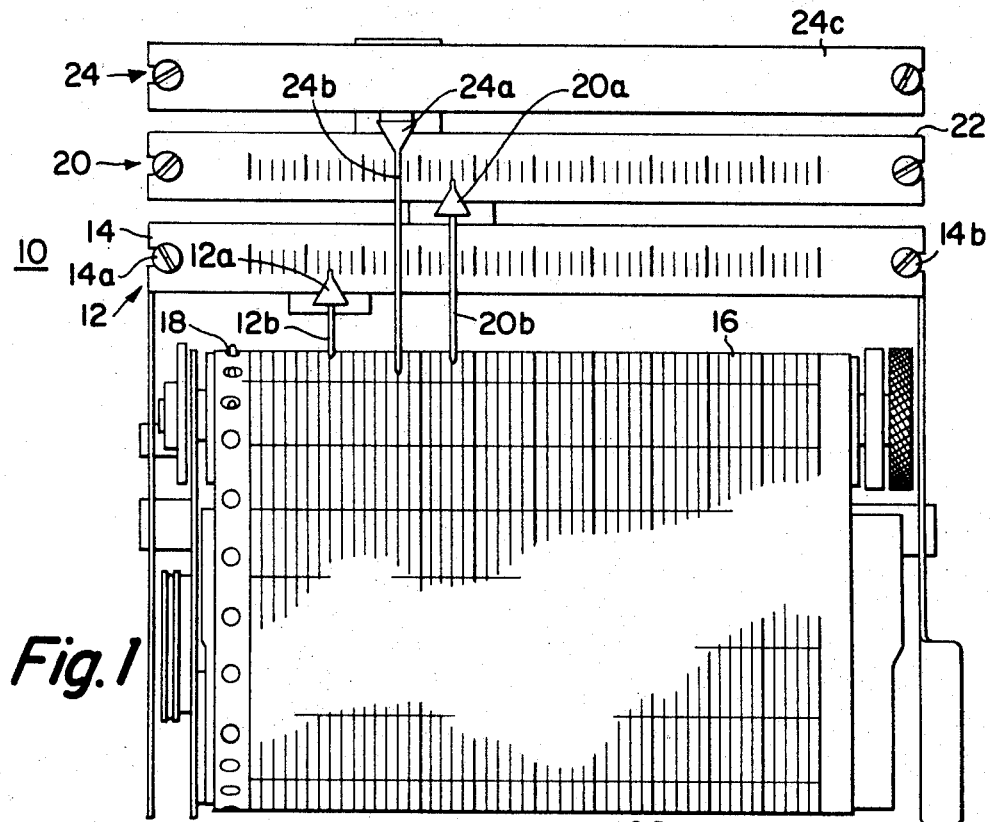
FIG. 1 illustrates a front view of a strip chart recorder according to this invention.

Referring to FIG. 1 of the drawings, a recording instrument 10 is shown adapted to indicate and record simultaneously the magnitudes of three measured variables. One variable is indicated and recorded using a module 12 which includes an indicating pointer 12a and a pen 12b of the capillary type. The pointer 12a indicates the magnitude of the first measured variable on a scale 14 supported by screws 14a and 14b above a strip chart 16 and across the front of the recording instrument 10. The chart 16 is advanced by means of a sprocket wheel 18 which is driven by a motive means (not shown) and the pen 12b in contact with the chart 16 records the value of the measured variable. A second pen module 20, including an indicating pointer 20a and a capillary recording pen 20b, is illustrated just above the module 12. It includes a scale 22 supported in a similar fashion as scale 14. The assembly 20 records and indicates the magnitude of a second measured variable. A third pen module 24 is shown above the pen module 20. It includes an indicating pointer 24a and a capillary pen 24b for indicating and recording the value of a third measured variable. In this case the indicator 24a projects downward and operates over the top portion of the indicator scale 22.

As can be seen in FIG. 1, the pen modules 12, 20, and 24 per se lie substantially behind the linear scales 14, 22, and a blank plate 24c; however, the indicators 12a, 20a, and 24a and the recording pens 12b, 20b, and 24b all project forward so as to lie in front of the linear scales 14, 22, and plate 24c. The distance of forward projection of each indicator and pen combination is determined by the lengths of the sets of parts so that they are free to slide in front of or behind one another. This is best seen by referring to FIG. 3.

Figure 2:
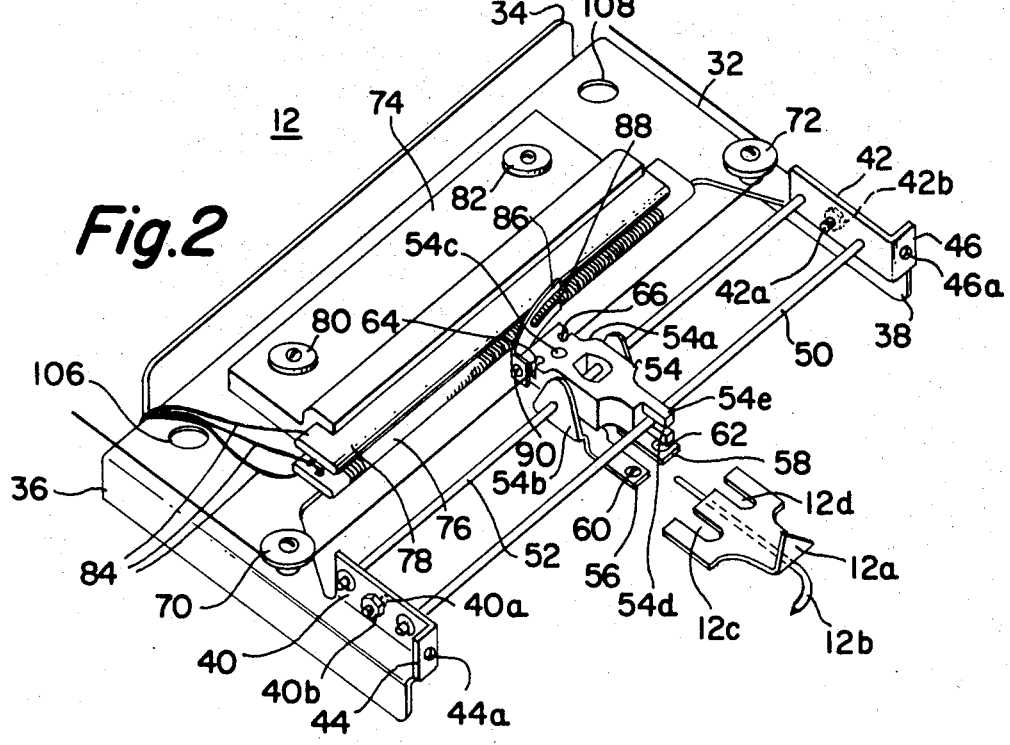
FIG. 2 is a perspective view of a pen module according to this invention.

Referring to FIG. 2, pen module 12, according to this invention is shown in greater detail, in perspective. While each of the indicator and pointer assemblies of FIG. 1 are associated with a respective pen module, the pen modules are identical and FIG. 2 should be taken as representative of them all. In FIG. 2 the pen module 12 includes a plate 32 which is substantially planar but includes an upturned flange 34 at its rear portion and a pair of downwardly turned flanges 36 and 38 on each side. In addition, the plate 32 includes a pair of upturned ears 40 and 42, each of which includes an outwardly turned flange, 44 and 46, respectively. The out-turned flanges 44 and 46 includes holes 44a and 46a, respectively, for accepting the screws 14a and 14b, shown in FIG. 1, for mounting the scale 14.

The plate 32 is cut away at its forward portion and a pair of guide rods 50 and 52 span the cutaway portion and are supported by the upturned flanges 40 and 42. The back guide rod 52 supports a two-piece pen carriage structure 54 comprising a molded insulating body member 54a and a thin metallic bracket member 54b. The bracket 54b includes a pair of forwardly extending tabs 56 and 58, each of which includes a screw 60 and 62, respectively, which cooperate with a pair of slots 12c and 12d provided in the horizontal portion of pointer 12a for securing the latter to the bracket member 54b. More specifically, the heads of screws 60 and 62 slide over the surface of 12a adjacent the slots 12c and 12d and when the pointer and pen, which are secured thereto, are lined up in desired relation to chart and scale, the screws 60 and 62 are tightened to secure 12a to the tabs 56 and 58. In this position, the assembly is perfectly registered with respect to the pen carriage structure 54. This method of assembly permits easy mounting and dismounting of the pointer 12a with its attached pen 12b, such as for cleaning the pen, while providing for easy alignment each time the assembly is remounted.

Both the insulating body member 54a and the upwardly bent sides of bracket member 54b include axially aligned holes. A pair of bearings (not shown) having conical outer ends are pressed into the holes of the body member 54a. The conical ends of these bearings pivotally engage the holes in the sides of bracket 54b. The guide rod 52 extends through the two bearings (not shown), permitting the bracket 54b to rotate about the shaft 52 and the pen carriage assembly to slide therealong. The bracket 54b may be biased for clockwise rotation to urge the pen 12b toward the chart by springs (not shown) secured to the undersurface of the body portion 54a. This helps keep the recording pen in contact with the chart paper. A stop screw (not shown) may be provided to extend downward from the back end of the body portion 54a to limit the extent of clockwise rotation of bracket 54b. This is adjusted through an access hole 54c.

Each of the upturned ears 40 and 42 includes a stop screw 40a and 42a respectively, arranged to extend inwardly and toward each other a distance determined by adjustment thereof after which each is secured by lock nuts 40b and 42b respectively. By aljustment of these two screws, the upper and lower limits of travel of the pen carriage structure 54, and therefore the indicator and pen, may be set with respect to a chart and scale. These high and low limit stops, being part of each module, enable each pen and indicator assembly to be set individually.

The insulating body structure 54a includes a pair of forwardly projecting fingers 54d and 54e which extend one under and the other over the forward guide rod 50. This prevents rotation of the insulating body structure 54a and retains it in a substantially horizontal plane during operation. The insulating body structure 54a is provided with a pair of keyhole shaped slots 64 and 66 into which the knotted ends of a drive cable or string 68 are inserted. In FIG. 2, the string is shown extending from the pen carriage structure 54 in both directions parallel to the guide rod 52 and then around a pair of pulleys 70 and 72 and toward the rear of the module 12. Although it is not shown in FIG. 2, it will be apparent from inspection of FIG. 4, that the string 68, when the module is inserted in a recording instrument, extends rearwardly of the module 12, around a guide pulley, and is operatively connected to the output shaft or a servo motor for positioning the pen carriage structure 54 along guide rod 52.

The plate 32 is cut away in its front portion for permitting movement of the pen carriage structure 54 as described above. At its rear, however, the plate 32 includes a substantially horizontal surface for mounting a slidewire structure 74 which includes a molded plastic body supporting a straight slidewire 76 which may comprise resistance wire wound on a mandrel in a manner understood by those skilled in the art and include a conductive bus bar or return trolley 78. The slidewire structure 74 is secured to the plate 32 by means of a pair of screws 80 and 82 and the slidewire and return trolley 76 and 78 are electrically connected by means of wires 84 to the measuring circuit (not shown) in the well known manner. An electrical contact bridging the slidewire 76 and the trolley 78 is provided by means of a pair of spring biased sliding contact prongs 86 and 88 mounted, by means of a screw 90, on the insulating body member 54a of the pen carriage structure 54. By this arrangement upon null-balance of the measuring circuit, the position of the pen carriage structure 54 along the guide rod 52 is an indication of the value of the measured quantity.

Figure 3:
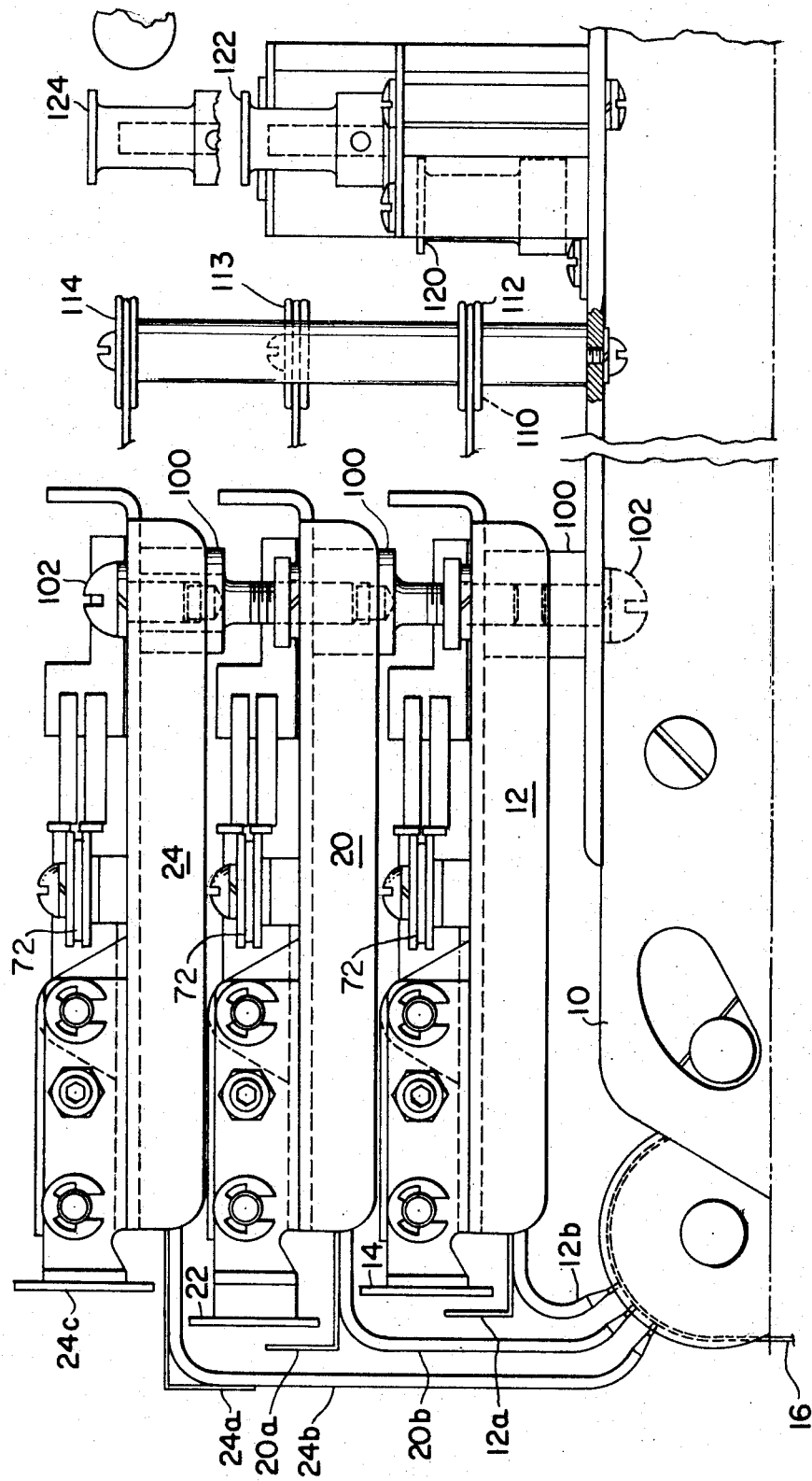
FIG. 3 is a side view of a portion of the recorder of FIG. 1 including three pen modules in stacked relationship according to this invention.

FIG. 3 is a side elevation of the upper front portion of the parts of interest of the recording instrument of FIG. 1, including three pen modules of the type depicted in FIG. 2, in stacked relationship for permitting the simultaneous measurement of three quantities. Since FIG. 3 is a side elevation of FIG. 1, the elements described with respect to FIG. 1, common in FIG. 3, will be given like reference numerals. Thus, FIG. 3 shows an end view of the pair of scales 14 and 22, and a blank plate 24c attached to the modules 12, 20, and 24 respectively, three indicators 12a, 20a, and 24a and recording pens 12b, 20b, and 24b. The indicator 12a extends forward and upward to provide an indication on the scale 14 while the indicators 20a and 24a extend forward and upward and downward, respectively, for providing an indication on the linear scale 22. The three recording pens 12b, 20b, and 24b, extend forwardly and downwardly and are in contact with the chart 16. It will be apparent that the recording pens and the indicators are of varying lengths depending upon the positioning of their respective modules in the stack.

The mounting arrangement of each module on top of one another is depicted in FIG. 3 and comprises a cantilever arrangement, whereby each module 12, 20, and 24 is supported at points near the rear of its respective plate. The mounting structure includes the utilization of adjustable male-female studs 100 and mounting screws 102. FIG. 2 shows a pair of holes 106 and 108 provided in the plate 32 near the rear and at either side thereof and the plates of pen modules 20 and 24 have corresponding holes. These holes permit insertion of the mounting screws 102 or the male portions of the studs 100. As will be apparent, all that is required when a greater or lesser number of measured points are to be recorded is to remove the screws 102 and either add or substract from the stack, the desired number of pen modules and the necessary spacer studs 100 and other parts as required.

FIG. 3 also includes an adjacent portion of the recording instrument 10 spaced rearwardly of the pen modules. This is shown broken away from the front portion, and is illustrative of how the strings or cables for each module utilized can be arranged so as not to interfere with each other. FIG. 3, together with FIG. 4, show pulleys 110, 112, 113, and 114 mounted at various heights, each pulley being at a height corresponding to its respective pen module. FIGS. 3 and 4 also show the capstans 120, 122, and 124 on the output shafts of three servo motors. They drive the strings, positioned at various heights, depending upon the height of the pen module in the stack with which each motor is operatively associated.

FIG. 4 is a plan view of the recording instrument 10 described with reference to FIGS. 1 and 3 and is illustrative of the arrangements of the various pulleys and servo motors utilized to drive the three pen carriage structures simultaneously and related parts. In FIG. 4 the three pen carriage structures 54 are shown in association with other parts, each pen carriage structure being identical to pen carriage structure 54 described with reference to FIG. 2. Each of the structures 54 are connected by strings 68 via pulleys 70, 72, 110, 112, 113, and 114 to respective capstans 120, 122, and 124 of the respective servo motors as above described. It will be remembered that the pulleys 110, 112, 113, and 114 are spaced for location at various heights as shown in FIG. 3. Additionally, it will be remembered that the three capstans of the servo motors are at various heights, as described with reference to FIG. 3. When it is desired to measure and record, for instance, a lesser number than three quantities, and when one or more of the pen modules are removed from the stack, all that is necessary is to disconnect and remove the unused pulley strings from the pulleys and, if desirable, the unused servo motors, pulleys and other excess parts can be removed from the recording instrument.

FIG. 4 also illustrates the means whereby ink is carried to the recording pens for permitting a permanent indication of the value of an external variable to be scribed on chart paper. To this end, three ink reservoirs are shown and are given reference numerals 126, 128, and 130, respectively. Three flexible capillary tubes 132, 134, and 136 are respectively connected between the three ink reservoirs and the capillary pens of the three pen modules. Each capillary tube lies loosely beneath its corresponding pen module and each is operatively connected to its recording pen for operation in the well known capillary fashion. Since the pen modules are positioned in spaced-stacked relationship with respect to each other, there is free space between each module permitting the capillary tubes to extend therethrough. Furthermore, the flexibility of the capillary tubes permits movement of the pen carriage structures along the guide rods without hindering a continuous flow of ink.

The use of this invention makes it possible to mass produce like parts, thereby resulting in lower costs, provides flexibility in production and an easy means to mount and adjust pre-assembled pen modules in a recorder in accordance with customer requirements. It also provides a packaged method of adding systems to recorders in the field. The pens are quickly removable for service.

While the invention has been described in terms of a preferred embodiment, namely the utilization of one to three module elements in a stack, it should be understood that the invention is not limited to the utilization of three of these elements but rather is characterized in that any greater or lesser number of module elements may be utilized as is desired. Furthermore, the specific structure described in reference to the drawings should not be considered limiting, inasmuch as the principles underlying the invention will suggest many modifications of this structure to those skilled in the art.

What is claimed is:

1. A recorder of the type including one or more self-balancing measuring systems for recording the value of one or more measured quantities comprising in combination:
   a recorder frame,
   means to secure one or more servo motors of said one or more measuring systems on said frame depending on the number of quantities to be measured,
   means to secure on said frame pen modules in stacked relationship, one pen module being provided for each quantity to be measured and recorded, each of said modules including in combination:
      a mounting plate,
      a straight slidewire and trolley structure of a measuring system mounted on said plate,
      linear guide means secured to said plate,
      a pen carriage structure slideably supported by said guide means, said pen carriage structure supporting contact means in sliding contact with said slidewire and trolley, and
      means carried by said mounting plate for supporting a drive connection between said pen carriage structure and said servo motor.

2. The combination as defined in claim 1 wherein said pen carriage structure comprises an electrically insulating body portion and a bracket member, said bracket member supporting an indicator and a pen and being pivotally mounted with respect to said insulating body and biased for limited rotation in a direction to urge said recording pen into contact with a record receiving means.

3. The combination as defined in claim 1 wherein said means carried by said mounting plate for supporting a drive connection comprises a pair of pulleys mounted on said mounting plate for cooperation with a cable mechanically linking said pen carriage structure with said servo motor.

4. The combination as defined in claim 1 wherein said means to secure said pen modules in stacked relationship comprises adjustable male-female stud and screw combinations adapted to mount said pen modules in spaced cantilever fashion from a rearward portion of said mounting plate.

References Cited

UNITED STATES PATENTS

| | | | |
|---|---|---|---|
| 1,886,844 | 11/1932 | Spitzglass | 346—145 X |
| 2,113,745 | 4/1938 | Ross et al. | 346—44 |
| 2,724,631 | 11/1955 | Ruhland | 346—49 |
| 3,071,772 | 1/1963 | Johnson et al. | 346—145 X |

RICHARD B. WILKINSON, *Primary Examiner.*

J. W. HARTARY, *Assistant Examiner.*